(12) United States Patent
Parisa

(10) Patent No.: US 10,467,475 B2
(45) Date of Patent: Nov. 5, 2019

(54) FOREST INVENTORY ASSESSMENT USING REMOTE SENSING DATA

(75) Inventor: Zachary Parisa, Huntsville, AL (US)

(73) Assignee: Yale University, New Haven, CT (US)

( * ) Notice: Subject to any disclaimer, the term of this patent is extended or adjusted under 35 U.S.C. 154(b) by 1282 days.

(21) Appl. No.: 13/704,386

(22) PCT Filed: Jun. 16, 2011

(86) PCT No.: PCT/US2011/040612
§ 371 (c)(1),
(2), (4) Date: Feb. 27, 2013

(87) PCT Pub. No.: WO2011/159855
PCT Pub. Date: Dec. 22, 2011

(65) Prior Publication Data
US 2013/0211721 A1 Aug. 15, 2013

Related U.S. Application Data

(60) Provisional application No. 61/397,867, filed on Jun. 16, 2010.

(51) Int. Cl.
*G06K 9/00* (2006.01)
*G06Q 10/08* (2012.01)
*G06K 9/62* (2006.01)

(52) U.S. Cl.
CPC ....... *G06K 9/00657* (2013.01); *G06K 9/6293* (2013.01); *G06Q 10/087* (2013.01)

(58) Field of Classification Search
CPC .................................................. G06Q 10/087
See application file for complete search history.

(56) References Cited

U.S. PATENT DOCUMENTS

| 5,857,169 | A | 1/1999 | Seide |
| 5,886,662 | A * | 3/1999 | Johnson ................... G01S 13/90 342/192 |
| 7,571,051 | B1 * | 8/2009 | Shulman ................ G01C 11/00 348/142 |
| 8,306,941 | B2 * | 11/2012 | Ma .......................... A01G 23/00 702/2 |
| 2006/0224327 | A1 | 10/2006 | Dunlap |
| 2007/0265781 | A1 | 11/2007 | Nemethy et al. |
| 2008/0133195 | A1 | 6/2008 | Rahmes et al. |
| 2009/0105954 | A1 | 4/2009 | Van Workmum et al. |
| 2010/0040260 | A1 | 2/2010 | Kelle et al. |
| 2011/0150290 | A1 * | 6/2011 | Welty ................ G06K 9/00657 382/110 |

\* cited by examiner

*Primary Examiner* — John E Breene
*Assistant Examiner* — Jeffrey C Morgan
(74) *Attorney, Agent, or Firm* — Mintz Levin Cohn Ferris Glovsky and Popeo, P.C.

(57) ABSTRACT

Methods and systems are provided that inventory a plot of trees based on data including one or more (e.g., all) of radar images of the plot, spectral images of the plot (e.g., high resolution images taken by satellite), other data (e.g., elevation, slope, aspect), and actual tree survey data physically collected about the plot and/or another plot having similar characteristics. Although the actual tree survey data collected is typically less than the amount of actual survey data used by prior approaches, the present systems and methods are still capable of inventorying the entire plot with a high degree of confidence (e.g., at least 95% confidence).

25 Claims, 7 Drawing Sheets

FOREST INVENTORY ASSESSMENT USING REMOTE SENSING DATA

CROSS-REFERENCE TO RELATED APPLICATIONS

This application is a 35 U.S.C. § 371 national stage entry of PCT/US2011/040612. which has an international filing date of Jun. 16, 2011 and claims priority to U.S. provisional patent application No. 61/397,867, filed Jun. 16, 2010, which is hereby incorporated by reference herein in its entirety.

FIELD OF THE INVENTION

Embodiments of the present invention relate to methods and systems for high accuracy forest inventory assessment using remote sensing data. For example, in some embodiments, computer-aided statistical analysis is used to accurately inventory one or more (e.g., all) of the number, size, genus, and species of trees present within a given plot of land. Instead of using "brute force" to physically visit and extensively survey the entire plot which would be cost prohibitive (e.g., using ground-based measures to count each tree, measure its size, and determine its genus and species), methods and systems are provided that inventory the trees on a plot of land based on data including one or more (e.g., all) of radar data, spectral images of the plot (e.g., high resolution images taken by satellite), actual tree survey data physically collected by ground-based measures, and other data (e.g., soils, elevation, slope, aspect). Although the actual tree survey data which is collected by ground-based measures is typically less than the amount of actual survey data used by prior approaches, the present systems and methods can still inventory the entire plot of land with a high degree of confidence (e.g., at least 95% confidence).

BACKGROUND OF THE INVENTION

A forest inventory is an estimate or census of a population parameter in or about a forest. Parties often pay for forest inventories of marketable forest products like standing timber volume and biomass/carbon.

Methods of inventorying standing timber may either be an estimate which predicts the population parameter total from a sample of the population, or a census, which measures all elements within the given population. Inventories are used to assess the value of the population and to develop management plans that mean to augment the population development trajectory in such a way that they will become more valuable.

Inventories must yield enough information of sufficient quality to make educated decisions, without becoming too costly such that the costs outweigh the foreseeable benefits. Inventories are therefore evaluated based on the quantity, quality, and cost of the information they provide. Quantity refers to the number of population parameters the information describes. For standing timber, the most common parameters are the number, size, and species of trees in the population. Since management of standing timber is planned at the management unit (stand) level, estimated information on individual trees is often summarized in tables that describe the stand. Quality most often refers to the amount of confidence that can be placed in the estimation to be within some % of the true value of the population parameter. The most common in the field of forest inventory is to be 90% confident that the estimate is within 10% of the true value. An increase in the desired quality typically necessitates greater sampling intensity, and therefore results in increased costs.

Several methods have been developed to create forest inventories of standing timber with the aim of reducing costs. General categories of methods, which are described in greater detail below, include: ground cruising, spectral, radar, and lidar plus spectral. Ground cruising involves taking a given population, such as a stand, estimating the internal variation that exists within the stand for a given parameter (usually basal-area which is the cross sectional area in an acre that is covered by tree stems), and solving the number of samples of a given size that are needed to achieve the desired quality of estimate. Measurements of parameters are collected in plots or points within the stand and aggregated to provide an estimate of the population or population mean.

Spectral methods (meaning passively collected images of reflected light in partitioned spectral bands from the ground) include the use of aerial photographs or satellite imagery to improve estimates and reduce the total cost of inventory. There are 3 ways of doing this:

1) Use images to either manually or automatically partition stands such that the internal variation per stand is minimized, therefore reducing the total number of plots required across multiple stands to achieve the desired inventory quality.

2) Correlate the reflectance values in a given pixel (across multiple spectral bands) to the population parameter measurements. The correlated values are then used to extrapolate an stand level estimation. This can be useful in producing forest type maps indicating a dominant species or set of species or harvested v. non-harvested lands.

3) Time series images may be used to asses between and among pixel variance to determine parameters such as age which occasionally correlate well to basal area.

Radar in various forms has been used to estimate the total basal area and qualitative measures of structure, but has largely been overlooked due to poor direct correlations between basal area and return values. More common is the integration of radar in analytical methods used to determine land use type (forest v. non-forest).

Lidar uses lasers to accurately measure the height of objects in 3 dimensional space. Individual trees are identified (with varying degrees of success). Height is correlated to diameter to characterize the volume of each tree. Lidar analysis is therefore a type of census. If combined with high resolution spectral imagery and a method of segmenting canopy space for each tree, it is theoretically possible to identify the species of each tree. Though there may be errors in segmentation, the result is a list of every identified tree's species and size in the population. The drawback is that this method is often more costly to deploy than the market will bear.

In view of the foregoing, it would be desirable to provide systems and methods for high accuracy, cost-effective forest inventory assessment.

SUMMARY OF THE INVENTION

Embodiments of the present invention provide automated systems and methods for forest inventory assessment. The methods and systems described herein assess one or more population parameters in or about a forest including, for example, the number, size, genus, and species of trees within a geographical area or plot of interest. Assessments by embodiments of the present invention may be used, for example, to determine the value of the tree population within that geographical area (e.g., the value of the land to a potential bidder), and/or to develop or guide management plans that aim to augment the population development trajectory in such a way that it becomes more valuable.

For example, in some embodiments of the present invention, a system and corresponding computer-aided method are provided for accurately inventorying the number, size (e.g., diameter and/or basal area), genus, and/or species of trees present within a given plot of land. The system and method generate the forest inventory based on data including one or more (e.g., all) of radar data, data from spectral images of the plot (e.g., digital images taken by satellite), actual tree survey data collected through ground-based measures, and other data (e.g., soils, elevation, slope, aspect).

In some embodiments of the present invention, a system and corresponding method for forest inventory assessment are provided that treat each pixel in a spectral image (e.g., each 15 meter by 15 meter portion of the spectral image) as a potential stand or contributing portion of a stand. Coefficients are estimated that are used to construct tree parameters of a hypothetical acre instead of measuring individual trees as in lidar plus spectral analysis methods. Ground measures are used as training data but the number required may be minimized by matching sample plots to pixels that match the multivariate distribution of pixel data instead of a certain spatial distribution. While estimates at the pixel level may not achieve a desired accuracy, the properties of the estimation techniques yield normally distributed errors, such that when many estimates (pixels) are aggregated the net variance is reduced and the estimate at the larger scale is improved. For example, in 2 test cases, estimates for areas larger than 10 acres yielded errors less than or equal to 5% at 95% confidence (obtained by Monte-Carlo simulation).

Some embodiments of the present invention are directed to a system, apparatus, and computer-implemented method of generating a forest inventory for a geographic area of land based at least in part on computer analysis of data extracted from radar imagery of the land, data extracted from spectral imagery of the land, and actual tree survey data physically collected using one or more ground-based measures. In some embodiments, elevation data for the land, slope data for the land, and/or aspect data for the land is also used to generate the forest inventory.

In some embodiments of the present invention, a system, apparatus, and computer-implemented method are provided for generating an estimate of at least one of the number, the size (e.g., volume, height, diameter and/or basal area), and the type of trees (e.g., genus, species, and/or product class) included on a geographic area of land. The estimate may be generated based at least in part on computer analysis of data extracted from radar imagery of the land, spectral imagery of the land, elevation data for the land, slope data for the land, aspect data for the land, and/or actual tree survey data physically collected using one or more ground-based measures.

In other embodiments of the present invention, a system, apparatus, and computer-implemented method are provided for generating an estimate of at least one of the frequency of occurrence of one or more tree genera (or species) on a geographical area of land, and the size of trees (e.g., diameter and/or basal area) of the one or more tree genera. For example, the estimate may include a plurality of importance values representing an index for site dominance by a corresponding plurality of genera on the land. The estimate may be generated based at least in part on computer analysis of data extracted from spectral imagery of the land, radar imagery of the land, elevation data for the land, slope data for the land, aspect data for the land, and/or actual tree survey data physically collected using one or more ground-based measures.

In some embodiments of the present invention, a system, apparatus, and computer-implemented method are provided for generating a prediction of at least one of the genus and species of a plurality of trees included on a geographical area of land. The prediction may be based on computer analysis of data extracted from spectral imagery of the land, elevation data for the land, slope data for the land, aspect data for the land, and/or actual tree survey data physically collected using one or more ground-based measures.

In some embodiments of the present invention, a system, apparatus, and computer-implemented method are provided for determining the tree genera of trees within a geographical area of land represented by an image pixel. One or more nearest neighbor pixels is determined for the image pixel in terms of statistical distance, where data (e.g., regarding the tree genera, tree sizes, and number of trees) corresponding to the nearest neighbor pixels is known. For example, the nearest neighbor pixels may be determined based on statistical analysis of one or more of the following variables: elevation data, slope data, aspect data, importance values, n, shape, and scale. The nearest neighbor pixels are used to generate a probability function for predicting the probability that a tree of a particular genus, when present on the land represented by the image pixel, would have a given size. The probability function is then used to predict the tree genera for a plurality of trees within the land represented by the image pixel. In some embodiments, the sizes of the trees within the land represented by the image pixel are known or estimated.

In still other embodiments of the present invention, a system, apparatus, and computer-implemented method are provided for determining the tree species of trees within a geographical area of land represented by an image pixel. One or more nearest neighbor pixels is determined for the image pixel in terms of statistical distance, where data regarding the tree species and tree sizes corresponding to the nearest neighbor pixels is known. The nearest neighbor pixels are used to generate a probability function for predicting the probability that a tree of a particular species, when present on the land represented by the image pixel, would have a given size. The probability function is then used to predict the tree species for a plurality of trees within the land represented by the image pixel. In some embodiments, the sizes of the trees within the land represented by the image pixel are known or estimated.

BRIEF DESCRIPTION OF THE DRAWINGS

For a better understanding of embodiments of the present invention, reference is made to the following description, taken in conjunction with the accompanying drawings, in which like reference characters refer to like parts throughout, and in which.

DETAILED DESCRIPTION OF THE PREFERRED EMBODIMENTS

Some embodiments of the present invention relate to systems and corresponding methods for forest inventory assessment that generate, based on data including minimal ground-based measures (training data), spectral images, radar images, and/or other data (e.g., soils data, elevation, slope, aspect), a list of trees with corresponding genera, species and/or sizes (e.g., diameter and/or basal area) that are likely to be present (e.g., on a representative acre within any given boundary) within an analysis area.

Figure 1:
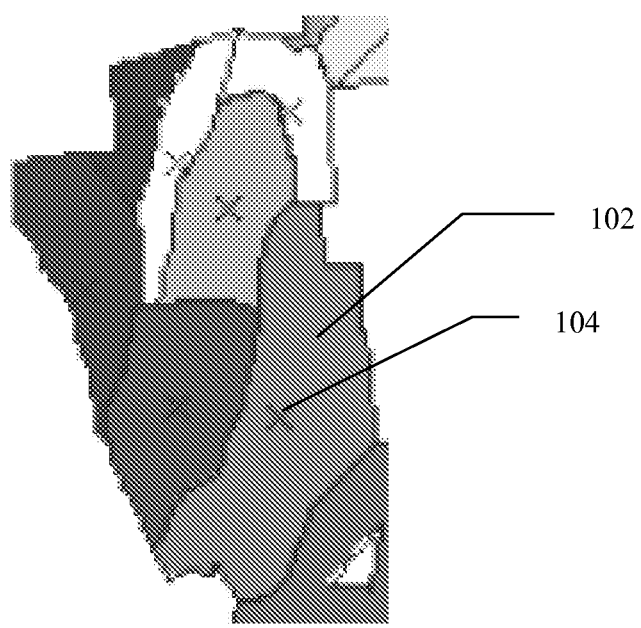
FIG. 1 is a schematic diagram 100 of various portions or stands of a forest according to some embodiments of the present invention.

FIG. 1 is a diagram 100 illustrating various portions or stands of a forest according to some embodiments of the present invention. Generally, the forest may be partitioned into a plurality of stands, such as stand 102. In some embodiments, stand partitioning may be accomplished using, for example, stand partitioning methods known to persons having ordinary skill in the art. Each stand may be a collection of trees with similar characteristics such that the area would react similarly to disturbances or prescribed treatments. The geographical area corresponding to a particular plot or stand may or may not be contiguous. Typically, the stand is the basic management unit of the forest. For example, often times it is desirable to assess the forest inventory within a given stand. Stands can be any size or shape and are thus best described as polygons.

FIGS. 2A-2D are flowcharts of illustrative stages involved in a method for forest inventory assessment according to some embodiments of the present invention. For example, this method could be used to produce an inventory for stand 102 (FIG. 1), and/or other stands of a forest or other geographical areas of interest.

Figure 2A:
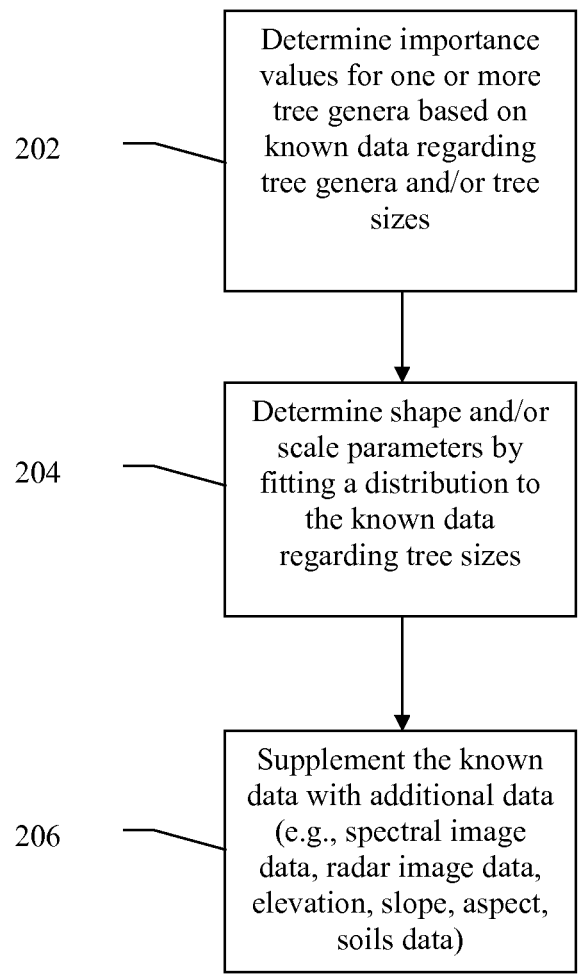
FIG. 2A is a flowchart of illustrative stages involved in utilizing known data regarding one or more sample plots for forest inventory assessment according to some embodiments of the present invention.

FIG. 2A is a flowchart of illustrative stages 202-206 involved in processing data for one or more sample plots for which at least some data regarding the trees included on the land is known. At stage 202, measured (i.e., known) tree genus (or species) and size data from one or more sample locations or plots is used to solve one or more importance values for one or more tree genera (e.g., one importance value for each given tree genus). In some embodiments, the sample plots may be part of an overall plot for which a forest inventory is desired. For example, with reference to FIG. 1, the one or more sample plots 104 utilized at stage 202 may be located within the stand 102 for which an inventory is desired. In other embodiments, one or more sample plots may be located outside of the overall plot (e.g., stand polygon 102) for which the forest inventory is desired but may have, for example, properties similar to those of the overall plot (e.g., similarity as determined by observation or multivariate analysis of, for example, ground-based data, radar data, and/or spectral images). For example, when sample location(s) are outside of the stand, such sample locations may be deemed suitable for use in stage 202 as a result of determining that the distribution of one or more variables (e.g., slope, aspect, and/or reflectance) regarding the sample location(s) is equal to or approximates the distribution of those variables for the stand.

In some embodiments of the present invention, each importance value may be an index for site dominance by a given tree genus (or species) in a given sample plot, where the importance value accounts for at least one of (e.g., both of) frequency of occurrence and size of individual trees of that genus in the sample plot. For example, each importance value may be a relative (e.g., 1-100) measure that corresponds to the amount of crown dominance a given genus may have in the pixel (image) space for an image corresponding to the sample plot. In one embodiment, each importance value is solved as the number of trees of a given genus divided by the total number of trees in the sample plot multiplied by 50, plus the amount of basal area of the given genus divided by the total basal area in the sample plot multiplied by 50, where the sum of the importance values for all genera in a sample plot equals 100. Generally, it is desirable for the composition of all genera in each sample plot to account for the full reflectance in an image pixel of the plot, which occurs (e.g., in summer months in some regions) when the forest in the sample plot has a closed canopy.

For example, in an illustrative experiment according to an embodiment of the present invention, the measured tree data for one sample plot of training data (plot ID=b4111) covering an area of 27.4 square meters (circular plot with a radius of approximately 9 meters) included the following genera and tree diameters (measured in centimeters at a height of 1.3 meters, also called the diameter at breast height (DBH)) for the following 27 trees:

TABLE 1

Example of Measured Tree Data From Sample Plot

| Tree Number | Genus | Tree Diameter (cm) | Basal Area (m$^2$) |
|---|---|---|---|
| 1 | betula | 20 | 0.13 |
| 2 | betula | 6 | 0.01 |
| 3 | betula | 10 | 0.03 |
| 4 | betula | 10 | 0.03 |
| 5 | betula | 8 | 0.02 |
| 6 | betula | 10 | 0.03 |
| 7 | betula | 6 | 0.01 |
| 8 | betula | 18 | 0.1 |
| 9 | betula | 6 | 0.01 |
| 10 | betula | 10 | 0.03 |
| 11 | betula | 8 | 0.02 |
| 12 | betula | 14 | 0.06 |
| 13 | betula | 8 | 0.02 |
| 14 | carpinus | 28 | 0.25 |
| 15 | carpinus | 18 | 0.1 |
| 16 | carpinus | 12 | 0.05 |
| 17 | quercus | 50 | 0.79 |
| 18 | quercus | 12 | 0.05 |
| 19 | quercus | 14 | 0.06 |
| 20 | quercus | 20 | 0.13 |
| 21 | quercus | 10 | 0.03 |
| 22 | quercus | 6 | 0.01 |
| 23 | salix | 20 | 0.13 |
| 24 | salix | 32 | 0.32 |

TABLE 1-continued

Example of Measured Tree Data From Sample Plot

| Tree Number | Genus | Tree Diameter (cm) | Basal Area (m$^2$) |
|---|---|---|---|
| 25 | salix | 6 | 0.01 |
| 26 | salix | 32 | 0.32 |
| 27 | sorbus | 12 | 0.05 |

Based on the sample plot data provided in Table 1, it was determined that of the 27.4 meters of the sample plot area the betula genus occupies 5 square meters (m$^2$), carpinus occupies 3.86 m$^2$, quercus occupies 10.42 m$^2$, salix occupies 7.67 m$^2$, and sorbus occupies 0.44 m$^2$. Thus, the importance value for the betula genus was determined to be: 50*(13/27)+50*(5/27.4)=~33.2. The importance values for the other genera were: carpinus=~12.6, quercus=~30.13, salix=~21.4, and sorbus=~2.65. In some embodiments, as a result of stage 202, a set of importance values is determined for each sample plot (e.g., if there are 10 sample plots, there will be 10 sets of importance values).

At stage 204, for each sample plot, shape and scale parameters are determined by fitting a distribution (e.g., Weibull distribution) to tree diameter as represented in the tree records. Alternatively, the distribution could be fit to basal area, which can be calculated from the diameter. For example, in an illustrative experiment, the following cumulative distribution function was used to fit the Weibull distribution for the sample plot reference in Table 1:

$$f(x; \lambda, k) = \begin{cases} \frac{k}{\lambda}\left(\frac{x}{\lambda}\right)^{k-1} e^{-(x/\lambda)^k} & x \geq 0 \\ 0 & x < 0 \end{cases}$$

where x was a random variable, k was the shape parameter, and λ was the scale parameter. Specifically, based on the basal area measurements for the 27 tree records of the sample plot referenced in Table 1, the shape and scale of the distribution for that sample plot were determined as follows: shape=0.82 and scale=0.09. As described in greater detail below in connection with stage 210, these values of shape and scale can be used to generate a computer-implemented statistical model for predicting the number of trees (n), shape, and scale for other plots of land for which this data is otherwise not readily available and thus a statistical estimation of an inventory is desired. In embodiments in which multiple sample plots are used at stage 202, a separate distribution may be fit to the basal area (or diameter) of the tree records in each sample plot (e.g., if there are 10 training plots, there are 10 weibull distributions fit), such that the shape and scale coefficients for each sample plot are determined at stage 204.

At stage 206, the measured field data for the one or more known sample plots analyzed in stage 202 is supplemented with additional data including, for example, spectral data and/or other data. The additional data is extracted for an area of a forest that matches the geographical location(s) of the one or more sample plots (e.g., latitude and/or longitude, and/or other quantitative absolute indicators of location on the earth's surface). For example, one or more images (e.g., spectral and radar images) of the forest canopy taken from above the forest are divided into one or more raster pixels corresponding to the locations of the sample plot(s) for which the known data was available. Thus, as a result of stage 206, each sample plot may have one or more pixels associated therewith, where each pixel may be a uniform grid unit with a known geolocation and area to which multiple data may be attributed. Each pixel (image or portion thereof) captures the reflectance of energy gathered by one or more sensors located above the forest at a known location in space (e.g., an image taken by a satellite). In some embodiments, each raster pixel represents an area on the ground that is 15 meters by 15 meters.

Figure 3:
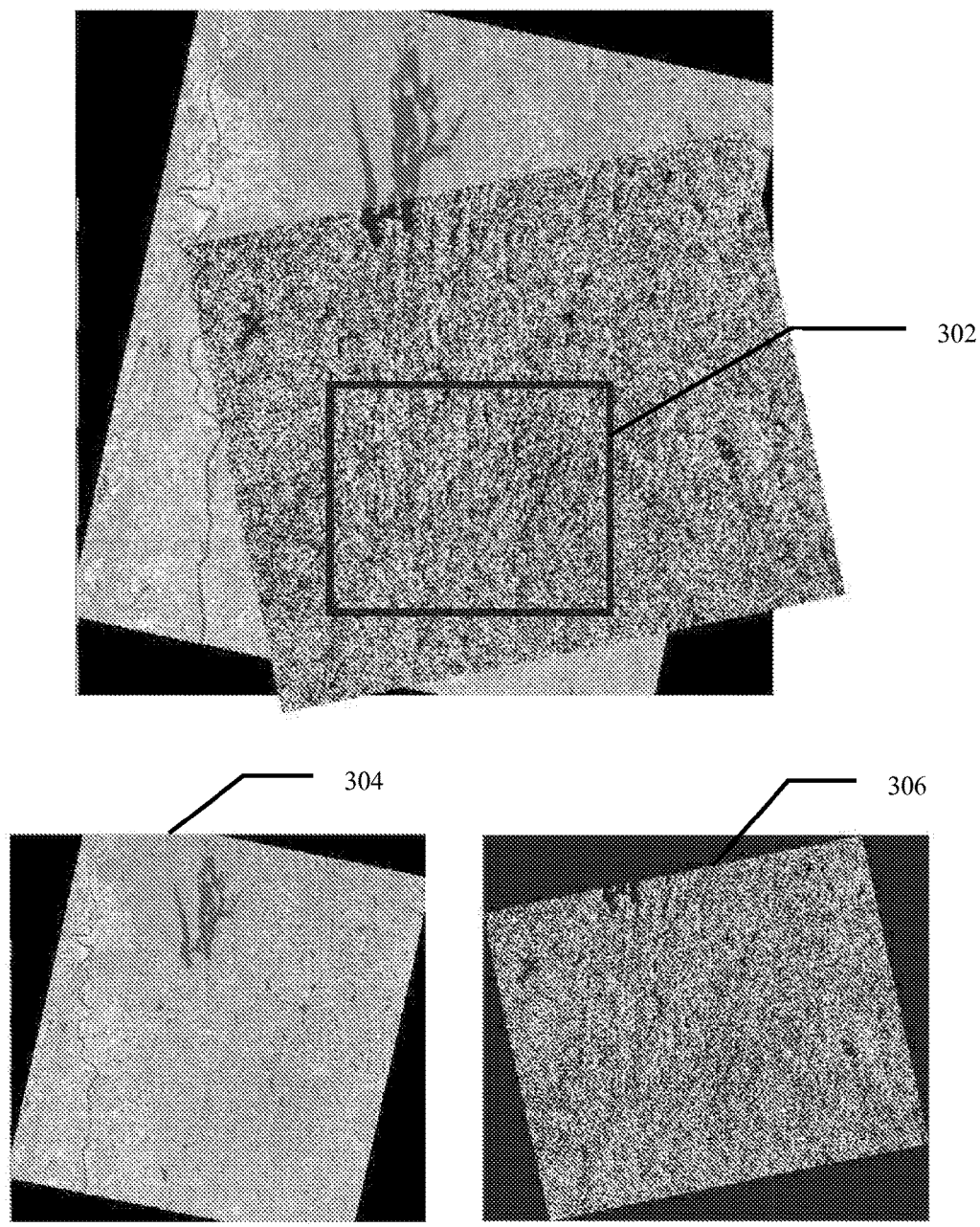
FIG. 3 illustrates an image data tile constructed from a spectral raster image and a radar raster image according to some embodiments of the present invention.

For example, FIG. 3 shows an example of a raster image data tile 302 constructed from a spectral raster image (visible light) 304 and a radar raster image 306 encompassing the same geolocation (e.g., a geolocation which encompasses the sample plot(s) referenced in stage 202). The tile 302 is the portion of the image represented by the red frame. The tile 302 can have one or more pixels and each pixel may have both spectral and radar data associated therewith.

Returning to FIG. 2, in some embodiments, values for one or more (e.g., all) of the following features are extracted or otherwise gathered at stage 206 from one or more raster pixels corresponding to the one or more sample plots: radar sigma values for HH (L-band), spectral bands 1-4 (red, blue, green, and near-infrared), elevation, aspect (North-South, and East-West), X(latitude), Y (longitude), slope (percent). Alternatively or additionally, values for one or more (e.g., all) of the following features are extracted or otherwise gathered from one or more raster pixels corresponding to the one or more sample plots: radar sigma values for HV (L-band) and soils (series represented by numeric factor). The foregoing examples are not intended to be limiting. For example, in still other embodiments, other values corresponding to the one or more sample plots could be alternatively or additionally extracted or otherwise gathered at stage 206 including, for example: C-band radar values, values corresponding to the VHF-band, and/or values corresponding to the quad-pole L-band.

For example, in the test case referenced in Table 1, a single pixel having both spectral image data and radar image data associated therewith was matched to the sample plot (plot ID=b4111). From that pixel, at stage 206 the following illustrative values were determined from the pixel and appended to the data (importance values, number, shape, and scale) already determined for the sample plot at stage 202: rad_hh=7640 (radar sigma value for HH (L-band)); spectral red=255.27, spectral green=117.06, spectral blue=83.48, and spectral near_IR=118.48 (values for spectral bands 1-4); elevation=2080 meters; aspect=302 degrees (representing values for both North-South (sine) and East-West (cosine)); slope=20%; and rad_hv=3508 (radar sigma value for HV (L-band)). The radar and spectral data was obtained from satellite images. The elevation data was obtained from NASA's Shuttle Radar Topography Mission (SRTM) dataset, and the aspect and slope were derived from the elevation data in a manner which would be apparent to a person having ordinary skill in the art. Data regarding soils, which may be utilized according to some embodiments of the present invention, may be taken from public record. The soils data may include, for example, a value representing soil quality which may be used to differentiate amongst measured plots. In some embodiments, the soils data may include a name of a soils series (e.g., Matheston-12 etc.). In some embodiments, the soils data may include a numeric value indicating, for example, fertility of the soil.

Figure 2B:
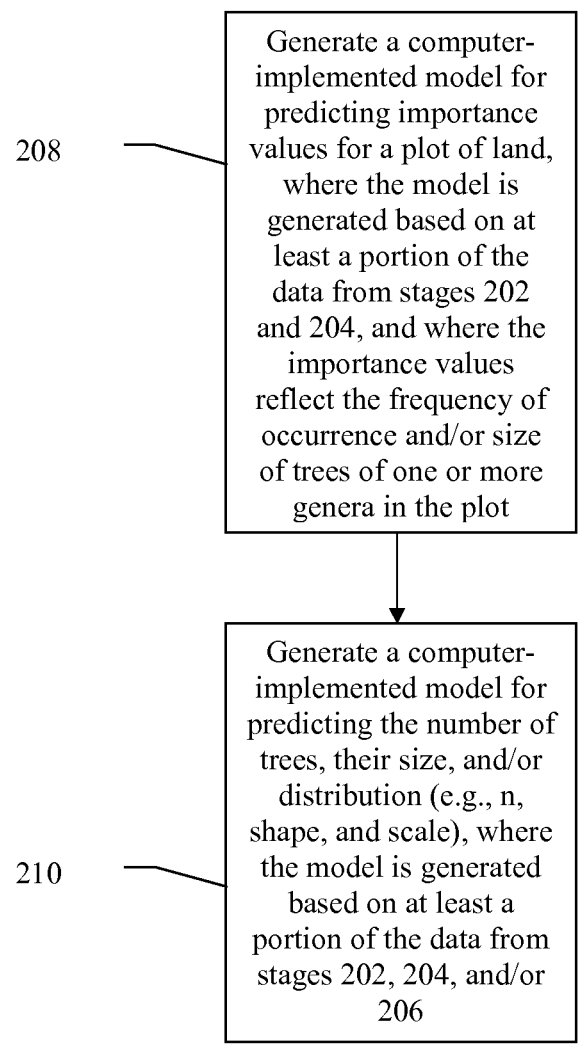
FIG. 2B is a flowchart of illustrative stages involved in generating statistical models for predicting the frequency of occurrence and/or size of trees of particular tree genera on a plot of land for which an inventory is desired, and/or the number of trees, shape, and scale corresponding to the trees on the plot, in accordance with some embodiments of the present invention.

FIG. 2B is a flowchart of illustrative stages 208-210 involved in generating statistical models for predicting the frequency of occurrence of trees and/or the size of trees of particular tree genera on a plot of land for which an inventory is desired, and/or the number of trees, shape, and scale corresponding to the trees on the plot. At stage 208, at least a portion of the data obtained at stages 202 and 206 (e.g., excluding radar data) is used to generate a computer-implemented statistical model (object) for estimating or predicting importance values for a plot of land, where the importance values reflect the frequency of occurrence and/or size of trees corresponding to particular tree genera within that plot. For example, the importance values generated by the model may be the same as or similar to the importance values discussed above in connection with stage 202. In some embodiments, the computer-implemented model may be generated at stage 208 by using at least a portion of the data obtained at stage 206 (e.g., spectral red, spectral blue, spectral green, spectral near IR, radar_hh, radar_hv, elevation, slope, aspect (North-South), and aspect (East-West)) to solve for the importance values obtained at stage 202.

Any suitable statistical modeling approach may be used to generate the importance model at stage 208. For example, in one embodiment, the library yaImpute (Crookston and Finley 2008) was used, which depends on the randomForest library (Liaw and Wiener 2002) within the R software for statistical computing (R Development Core Team 2009). For example, the random forest method utilized according to some embodiments of the present invention may be implemented using one or more computers, and may perform process steps which are the same as or similar to the processes implemented by the commercially-available random forest software tool described in A. Liaw and M. Wiener (2002), Classification and Regression by randomForest, R News 2(3), pp. 18-22, which is hereby incorporated by reference herein in its entirety.

In some embodiments of the present invention, once generated the computer-implemented model resulting from stage 208 may be configured to (i) receive data regarding one or more pixels as input and (ii) in response to the input, output one or more values indicative of the importance (e.g., frequency of occurrence and/or size of trees) of one or more tree genera likely to be present on the plot of land represented by the one or more pixels. In some embodiments, the data input to the model may include data for the same set of features that was used to generate the model (e.g., spectral red, spectral blue, spectral green, spectral near IR, radar_hh, radar_hv, elevation, slope, aspect (North-South), and aspect (East-West)). In some embodiments, statistical feature selection may be performed during generation of the model to increase (e.g., optimize) the predictive ability of the model.

At stage 210, at least a portion of the data obtained at stages 202, 204, and/or 206 is used to generate a computer-implemented statistical model for predicting the number of trees, their size, and/or their type (e.g., n, shape, scale) on a given plot of land. For example, a computer-implemented model for predicting n, shape, and scale may be generated at stage 210 by using at least a portion of the data from stages 202 and/or 206 and/or other data (e.g., importance values, radar_hh, radar_hv, spectral data, elevation, slope, aspect (North-South), and aspect (East-West)) to solve for the values of n, shape, and scale determined at stage 204. Any suitable statistical modeling approach may be used to generate the model. For example, in one embodiment, the library yaImpute (Crookston and Finley 2008) was used to generate the model, which depends on the randomForest library (Liaw and Wiener 2002) within the R software for statistical computing (R Development Core Team 2009).

In some embodiments of the present invention, once generated, the computer-implemented model resulting from stage 210 is configured to (i) receive data regarding one or more pixels as input (e.g., importance values generated at stage 208) and (ii) in response to the input, output one or more values indicative of the number of trees, shape, and scale corresponding to the land represented by the one or more pixels. In some embodiments, the data input to the model may include data for the same set of features that was used to generate the object (e.g., importance values, radar_hh, radar_hv, elevation, slope, aspect (North-South), and aspect (East-West)). In some embodiments, statistical feature selection may be performed during generation of object to increase (e.g., optimize) the predictive ability of the model.

Figure 2C:
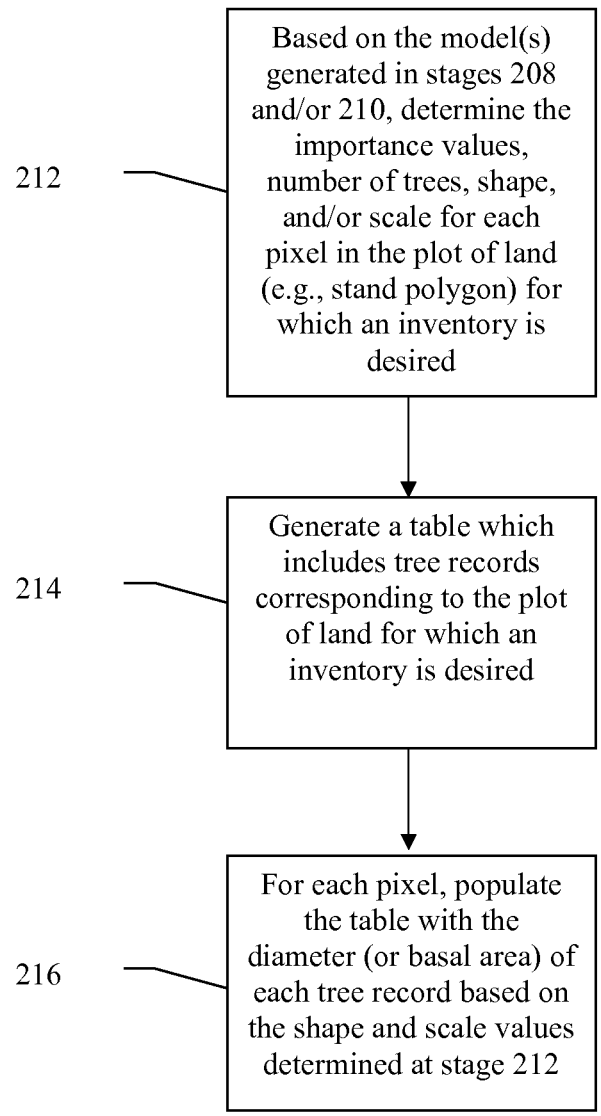
FIG. 2C is a flowchart of illustrative stages involved in determining the number and size (diameter and/or basal area) of trees within a plot of land for which a forest inventory is desired according to some embodiments of the present invention.
Figure 2D:
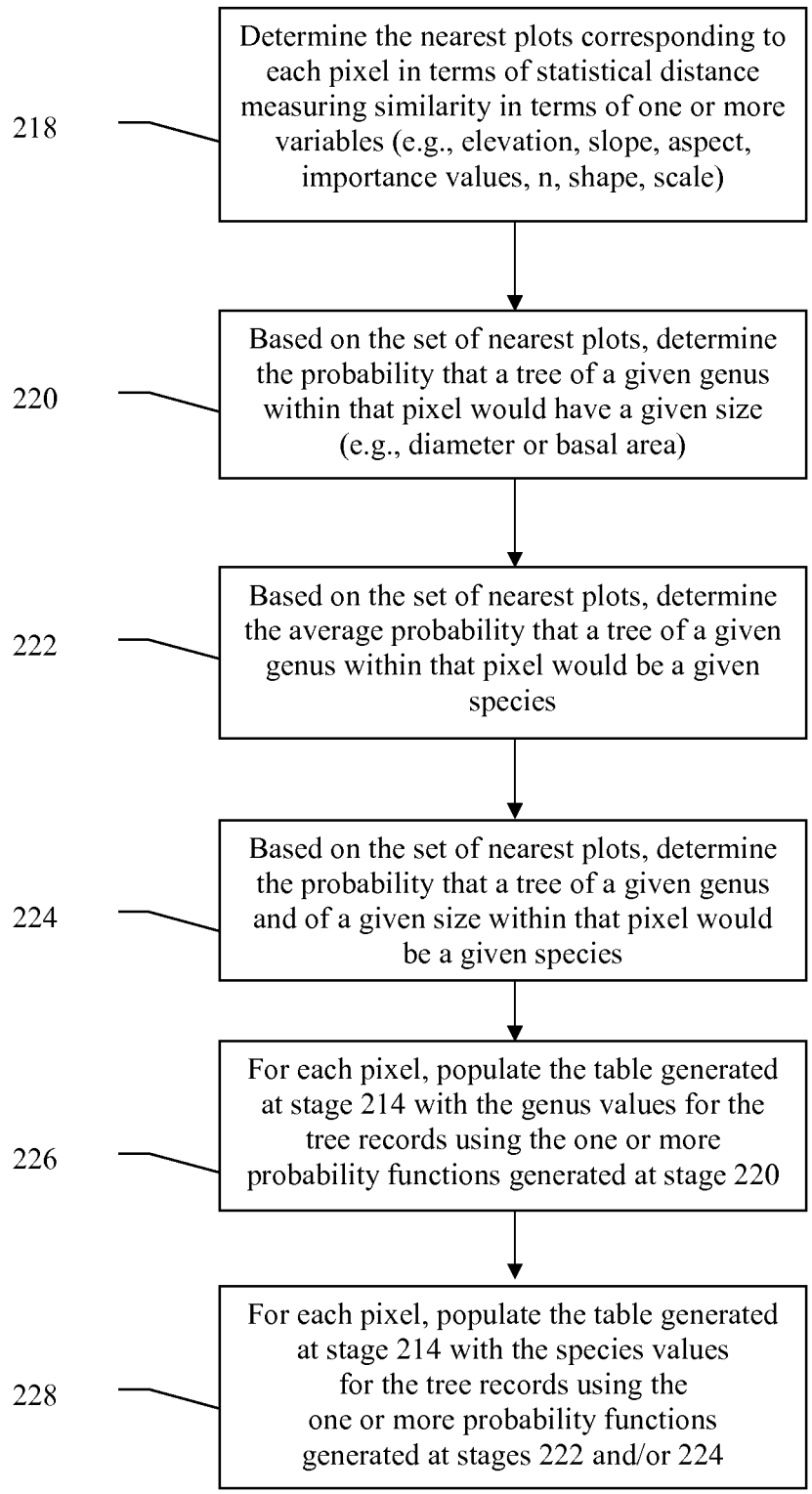
FIG. 2D is a flowchart of illustrative stages involved in determining the tree genera and tree species of trees within a plot of land for which a forest inventory is desired according to some embodiments of the present invention.

FIG. 2C is a flowchart of illustrative stages 212-216 involved in, for example, determining the number and size (e.g., diameter and/or basal area) of trees within a plot of land for which a forest inventory is desired. At stage 212, the models generated at stages 208 and 210 are used to evaluate data for one or more (e.g., all) pixels in the plot of land for which an inventory is desired (e.g., stand polygon). As a result of stage 212, the importance values and the values for n, shape, and scale are determined for each pixel in the stand. In some embodiments, the estimated values of importance may be scaled such that the sum of the values for all genera equals 100.

At stage 214, a table is generated which includes tree records corresponding to the plot of land (e.g., stand polygon) for which an inventory is desired. For each tree record, the table may initially include empty values for size (e.g., diameter and/or basal area), genus, species, and/or product class, which empty values may be populated in stages 216-228 as described below in order to assess an inventory of a forest. A product class may be a group that many species may be a member of or that is marketed similarly (e.g., many species of oak trees may be grouped into "red-oak" and/or "white-oak" product classes for purposes of valuation and/or sale). The number of tree records included within the table generated at stage 214 may be equal to the sum of the n values determined at stage 212 for all the pixels in the stand (e.g., including the tree records corresponding to any sample plots within the stand used at stage 202).

At stage 216, for each pixel, the shape and scale values determined at stage 212 for that pixel are used to populate the size (e.g., diameter and/or basal-area) data fields for the tree records for that pixel in the table. For example, the size data fields may be populated with random deviates that fit the shape and scale variables determined for that pixel at stage 212.

At stage 218, for each pixel, determine the "nearest" plots in terms of statistical distance (e.g., 20 nearest pixels, where each plot is represented by a pixel). For example, the "nearest" pixels may be determined by computer-implemented nearest neighbor statistical analysis of one or more (e.g., all) variables including: site values (e.g., elevation, slope, aspect_NS, and/or aspect_EW), importance values, and/or n, shape, and/or scale values. In some embodiments, at stage 218, all available plot data (e.g., spatially referenced or not) may be used to determine the nearest neighbors for the pixel under consideration. For example, for areas inside the United States, Forest Inventory and Analysis (FIA) data may be used. In some embodiments, the pixels which are deemed the nearest neighbors to the pixel under consideration may be for known sample plots (e.g., genus, species, and tree size is known) which are outside the plot of land for which an inventory is desired. In some embodiments, the nearest neighbors may alternatively or additionally be sample plots within the plot of land for which an inventory is desired (e.g., where the nearest neighbors selection process considers physical distance (e.g., inside, outside, near, far) in addition to statistical nearness in terms of, for example, elevation, aspect, n, shape, or scale).

At stage 220, for each pixel, the set of nearest neighbors for that pixel is used to solve for the probability that a tree of a particular genus within that pixel would have a given size (e.g., a particular diameter or basal area). For example, in one embodiment, the following cumulative distribution function for a Weibull distribution was solved, where x=tree diameter (or basal area):

$$F(x;k,\lambda)=1-e^{-(x/\lambda)^k}.$$

For each pixel, multiple Weibull distributions may be fit at stage 220, one for each genus referenced in the importance values for the pixel.

At stage 222, for each pixel, the set of nearest neighbors for that pixel is used to determine the average probability that a tree of a particular genus within the land represented by that pixel would be a particular species (or product class). For example, in one embodiment, the average relative frequency of each species among the nearest neighbor pixels was used to determine the probability that a given tree within a genus would be a given species. For each pixel, multiple probabilities may be determined at stage 222, one for each species represented in the nearest neighbor pixels (e.g., determining the probability that a given species will occur within a given pixel at all).

At stage 224, for each pixel, the set of nearest neighbors for that pixel is used to solve for the probability that a tree of a particular genus and of a specific size within the land represented by that pixel would be a given species. For example, in one embodiment, the following cumulative distribution function for a Weibull distribution was solved, where x=tree diameter (or basal area):

$$F(x;k,\lambda)=1-e^{-(x/\lambda)^k}.$$

For each pixel, multiple probability functions may be determined at stage 224, one for each species represented in the nearest neighbor pixels.

At stage 226, for each pixel, the one or more probability functions generated at stage 220 for that pixel are used to populate the table generated at stage 214 with genus values. The allocation of particular genus to a tree record in the table may be optimized. For example, the sum of probabilities resulting from the genera values selected at stage 226 may be maximized, as determined by inserting those genera values into the probability function(s) generated at stage 220 and summing the resulting probabilities. For example, in one embodiment, the simplex algorithm of linear programming was used to select the optimal genera values at stage 226, subject to the conditions that only one tree genus is assigned to each tree record and that the per-pixel genus importance values determined at stage 212 must be satisfied.

At stage 228, for each pixel, and for each diameter-genus pair resulting from stage 226, the one or more probability functions generated at stages 222 and/or 224 for that pixel are used to populate the table generated at stage 214 with species values (e.g., sylvestris species, betulus species, nigra species). The allocation of a particular species (or product class) to a tree record in the table may be optimized. For example, the sum of probabilities resulting from the species values selected at stage 228 may be maximized, as determined by inserting those species values into the probability function(s) generated at stage 224 and summing the resulting probabilities. For example, in one embodiment, the simplex algorithm of linear programming was used to select the optimal species values at stage 228, subject to the conditions that only one tree species is assigned to each tree record and that the number (proportion) of each species (or product class) determined at stage 222 must be satisfied.

Stages 216-228 may be repeated for each pixel in the plot of land (e.g., stand polygon) for which an inventory is desired. Thus, in some embodiments, the result of method 200 is an optimized list of trees with genera, species, and sizes (e.g., diameter and/or basal area) that approximate the actual distribution of genera, species, and sizes of trees in the stand. Other information may also be provided (e.g., stand identifiers, pixel identifiers, tree identifiers). In some embodiments, when multiple stands or other geographical areas are in need of an inventory, multiple iterations of the method set forth in FIGS. 2A-2C may be performed (e.g., one iteration per stand).

Figure 4:
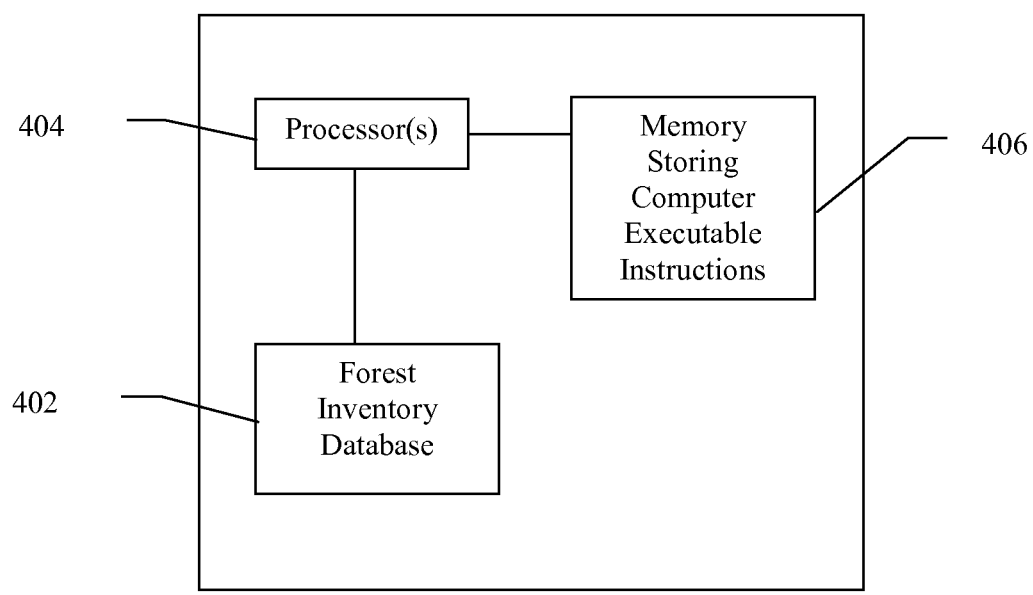
FIG. 4 is a block diagram of a system and apparatus for forest inventory assessment according to some embodiments of the present invention.

FIG. 4 is a block diagram of a system 400 for forest inventory assessment according to some embodiments of the present invention. System 400 may include any suitable hardware, software, or combination thereof for assessing a forest inventory of a plot of land based on, for example, data extracted from radar imagery of the plot, data extracted from spectral imagery of the plot, actual tree survey data physically collected about the plot, and/or other data (e.g., some or all of the data described above in connection with FIGS. 2A-2C). For example, in some embodiments, system 400 may include memory 402 (e.g., a database) which stores data (e.g., ground-based measures, radar data, spectral data, elevation data, slope, aspect, etc.) regarding, or which is useful in generating, a forest inventory. For example, memory 402 may store data regarding one or more sample plots for which at least some data regarding the trees on the plots is known. As another example, memory 402 may store data (e.g., radar image data and/or spectral image data) corresponding to land for which a forest inventory is desired or has been completed (e.g., output data representing the forest inventory itself). In some embodiments, system 400 may include one or more processors 404 for performing one or more (e.g., all) of the functions set forth in FIGS. 2A-2C. For example, in some embodiments, system 400 may include memory 406 (e.g., computer-readable storage media) encoded with computer-executable instructions for causing processor(s) 404 to perform one or more (e.g., all) of the functions set forth in the method described in FIGS. 2A-2C. For example, memory 406 may include instructions for implementing the models generated at stages 208 and 210 (FIG. 2B). In some embodiments, the computer-implemented method set forth in FIGS. 2A-2C may be performed fully or partially automatically, for example, once the plot of land for which an inventory is desired is identified. In some embodiments, an operator may be provided with an interface (e.g., audio and/or visual user interface) for inputting one or more inputs or operational parameters including, for example, the number of nearest neighbors to identify at stage 218 and/or the output format of the forest inventory (e.g., show/hide plot identifier, pixel identifier, tree record identifier, importance values, genus, species, basal area, diameter, etc.).

ADDITIONAL EMBODIMENTS

Thus it is seen that methods and systems are provided for forest inventory assessment. Although particular embodiments have been disclosed herein in detail, this has been done by way of example for purposes of illustration only, and is not intended to be limiting with respect to the scope of the appended claims, which follow. In particular, it is contemplated by the applicant that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. Applicant reserves the right to pursue such inventions in later claims.

Insofar as embodiments of the invention described above are implementable, at least in part, using a computer system, it will be appreciated that a computer program for implementing at least part of the described methods and/or the described systems is envisaged as an aspect of the present invention. The computer system may be any suitable apparatus, system or device. For example, the computer system may be a programmable data processing apparatus, a general purpose computer, a Digital Signal Processor or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by means of one or more application specific integrated circuits.

Suitably, the computer program can be stored on a carrier medium in computer usable form, which is also envisaged as an aspect of the present invention. For example, the carrier medium may be solid-state memory, optical or magneto-optical memory such as a readable and/or writable disk for example a compact disk (CD) or a digital versatile disk (DVD), or magnetic memory such as disc or tape, and the computer system can utilize the program to configure it for operation. The computer program may also be supplied from a remote source embodied in a carrier medium such as an electronic signal, including a radio frequency carrier wave or an optical carrier wave.

What is claimed is:

1. A computer-implemented method for assessing forest inventory, the computer-implemented method comprising:
    positioning one or more ground-based measures relative to a geographical area of land to physically collect an actual tree survey data, collecting the actual tree survey data, and transmitting the collected to data to at least one processor communicatively coupled with the one or more ground-based measures;
    positioning one or more sensors above the geographical area of land at a predetermined location in space and obtaining a reflectance of energy from the geographical area of land;
    receiving data from radar imagery of the land, spectral imagery of the land, and the actual tree survey data physically collected using the one or more ground-based measures for the geographical area of land, the geographical area of land being represented by an image pixel, the image pixel representing a plurality of trees contained within the geographical area of land;
    rasterizing at least one radar image and at least one spectral image to generate the image pixel, the generated image pixel containing data associated with a predetermined size portion of at least one of the following: the at least one radar image and the at least one spectral image;
    performing, based on the received data and the rasterizing, a graphic analysis of the image pixel, the graphic analysis including
        extracting, based on the reflectance of energy from the geographical area of land captured in the image pixel, data representing the plurality of trees; and
        determining, based on the extracted data, at least a crown dominance value of a tree genus in the image pixel;
    generating, based on the performed graphic analysis, a forest inventory for the geographical area of land; and
    storing the generated forest inventory;
    wherein at least one of the receiving, the rasterizing, the performing, the generating, and the storing is performed by at least one processor of at least one computing system.

2. The computer-implemented method of claim 1, wherein the generating includes generating the forest inventory based on at least one of the following: an elevation data for the land, a slope data for the land, an aspect data for the land, and any combination thereof.

3. The computer-implemented method of claim 1, wherein the forest inventory comprises an estimate of at least one of the number, the size, and the type of trees included on said area of land.

4. The computer-implemented method of claim 3, wherein said estimate of at least one of the number, the size, and the type of trees included on said area of land comprises at least one of the volume, height, diameter, or basal area for each tree included on said area of land.

5. The computer-implemented method of claim 1, wherein the forest inventory comprises an estimate indicative of at least one of the frequency of occurrence of one or more tree genera on said area of land, and size of trees of said one or more tree genera.

6. The computer-implemented method of claim 5, wherein said estimate comprises one or more importance values for said one or more tree genera.

7. The computer implemented method of claim 6, wherein each of said importance values represents the number of trees of a particular genus on said area of land and the basal area of said genus on said area of land.

8. The computer-implemented method of claim 1, wherein the generating further comprises
    determining for the image pixel a plurality of nearest neighbor pixels in terms of statistical distance, wherein data regarding the tree genera, number of trees, and tree sizes corresponding to the nearest neighbor pixels is known;
    generating, using the nearest neighbor pixels, a probability function for predicting the probability that a tree of a particular genus, when present on the land represented by the image pixel, would have a given size; and
    predicting, using the probability function, the tree genera for a plurality of trees within the land represented by the image pixel.

9. The computer-implemented method of claim 8, further comprising determining the plurality of nearest neighbor pixels based on statistical analysis of one or more variables including at least one of the following elevation data, slope data, aspect data, importance values, n, shape, scale, and any combination thereof.

10. The computer-implemented method of claim 8, wherein the sizes of the plurality of trees within the land represented by the image pixel are known or estimated.

11. The computer-implemented method of claim 8, wherein using the probability function to predict the tree genera includes
    maximizing a sum of probabilities corresponding to the predicted tree genera, subject to the condition that known or estimated importance values corresponding to the genera present within the land represented by the image pixel must be satisfied, wherein each of said importance values represents the number of trees of a particular genus on said area of land and the basal area of said genus on said area of land.

12. The computer-implemented method of claim 1, wherein the generating further comprises
  determining, for the image pixel, a plurality of nearest neighbor pixels in terms of statistical distance, wherein data regarding the tree species and tree sizes corresponding to the nearest neighbor pixels is known;
  generating, using the nearest neighbor pixels, a probability function for predicting a probability that a tree of a particular species, when present on the land represented by the image pixel, would have a given size; and
  predicting, using the probability function, the tree species for a plurality of trees within the land represented by the image pixel.

13. The computer-implemented method of claim 12, wherein the sizes of the plurality of trees within the land represented by the image pixel are known or estimated.

14. The computer-implemented method of claim 12, wherein the predicting includes
  maximizing a sum of probabilities corresponding to the predicted tree species, subject to the condition that known or estimated proportions of species on said area of land must be satisfied.

15. An apparatus for assessing forest inventory, the apparatus comprising:
  at least one memory; and
  at least one processor operatively coupled to the at least one memory and configured to:
    receive data from radar imagery of the land, spectral imagery of the land, and actual tree survey data physically collected using one or more ground-based measures for a geographical area of land, the geographical area of land being represented by an image pixel, the image pixel representing a plurality of trees contained within the geographical area of land, wherein the one or more ground-based measures are positioned relative to a geographical area of land to physically collect an actual tree survey data, collect the actual tree survey data, and configured to transmit the collected to data to the at least one processor communicatively coupled with the one or more ground-based measures, wherein one or more sensors are positioned above the geographical area of land at a predetermined location in space and obtain a reflectance of energy from the geographical area of land;
    rasterize at least one radar image and at least one spectral image to generate the image pixel, the generated image pixel containing data associated with a predetermined size portion of at least one of the following: the at least one radar image and the at least one spectral image;
    perform, based on the received data and the rasterization, a graphic analysis of the image pixel, the graphic analysis including
      extracting, based on the reflectance of energy from the geographical area of land captured in the image pixel, data representing the plurality of trees; and
      determining, based on the extracted data, at least a crown dominance value of a tree genus in the image pixel;
    generate, based on the performed graphic analysis, a forest inventory for the geographical area of land; and
    store the generated forest inventory.

16. The apparatus of claim 15, wherein the generating of the forest inventory is based on at least one of the following: an elevation data for the land, a slope data for the land, an aspect data for the land, and any combination thereof.

17. Apparatus for assessing forest inventory, the apparatus comprising:
  a means for receiving data from radar imagery of the land, spectral imagery of the land, and actual tree survey data physically collected using one or more ground-based measures for a geographical area of land, the geographical area of land being represented by an image pixel, the image pixel representing a plurality of trees contained within the geographical area of land, wherein the one or more ground-based measures are positioned relative to a geographical area of land to physically collect an actual tree survey data, collect the actual tree survey data, and configured to transmit the collected to data to the at least one processor communicatively coupled with the one or more ground-based measures, wherein one or more sensors are positioned above the geographical area of land at a predetermined location in space and obtain a reflectance of energy from the geographical area of land;
  a means for rasterizing at least one radar image and at least one spectral image to generate the image pixel, the generated image pixel containing data associated with a predetermined size portion of at least one of the following: the at least one radar image and the at least one spectral image;
  a means for performing, based on the received data and the rasterizing, a graphic analysis of the image pixel, the graphic analysis including
    extracting, based on the reflectance of energy from the geographical area of land captured in the image pixel, data representing the plurality of trees; and
    determining, based on the extracted data, at least a crown dominance value of a tree genus in the image pixel;
  a means generating, based on the performed graphic analysis, a forest inventory for the geographical area of land; and
  a means for storing the generated forest inventory.

18. The apparatus of claim 17, wherein said means for generating the forest inventory further comprises means for generating said forest inventory based on at least one of the following: an elevation data for the land, a slope data for the land, an aspect data for the land, and any combination thereof.

19. A non-transitory computer-readable storage medium comprising computer-executable instructions recorded thereon for performing the method comprising:
  receiving data from radar imagery of the land, spectral imagery of the land, and actual tree survey data physically collected using one or more ground-based measures for a geographical area of land, the geographical area of land being represented by an image pixel, the image pixel representing a plurality of trees contained within the geographical area of land, wherein the one or more ground-based measures are positioned relative to a geographical area of land to physically collect an actual tree survey data, collect the actual tree survey data, and configured to transmit the collected to data to the at least one processor communicatively coupled with the one or more ground-based measures, wherein one or more sensors are positioned above the geographical area of land at a predetermined location in space and obtain a reflectance of energy from the geographical area of land;

rasterizing at least one radar image and at least one spectral image to generate the image pixel, the generated image pixel containing data associated with a predetermined size portion of at least one of the following: the at least one radar image and the at least one spectral image;

performing, based on the received data and the rasterizing, a graphic analysis of the image pixel, the graphic analysis including extracting, based on the reflectance of energy from the geographical area of land captured in the image pixel, data representing the plurality of trees; and determining, based on the extracted data, at least a crown dominance value of a tree genus in the image pixel;

generating, based on the performed graphic analysis, a forest inventory for the geographical area of land; and storing the generated forest inventory.

20. The computer-readable storage medium of claim 19, wherein the generating further includes generating the forest inventory based on at least one of the following: an elevation data for the land, a slope data for the land, an aspect data for the land, and any combination thereof.

21. A method for assessing forest inventory, the method comprising:

positioning one or more ground-based measures relative to a geographical area of land to physically collect an actual tree survey data, collecting the actual tree survey data, and transmitting the collected to data to at least one processor communicatively coupled with the one or more ground-based measures;

positioning one or more sensors about the geographical area of land at a predetermined location in space and obtaining a reflectance of energy from the geographical area of land;

receiving data from radar imagery of the land, spectral imagery of the land, and actual tree survey data physically collected using one or more ground-based measures for a geographical area of land, the geographical area of land being represented by an image pixel, the image pixel representing a plurality of trees contained within the geographical area of land;

rasterizing at least one radar image and at least one spectral image to generate the image pixel, the generated image pixel containing data associated with a predetermined size portion of at least one of the following: the at least one radar image and the at least one spectral image;

performing, based on the received data and the rasterizing, a graphic analysis of the image pixel, the graphic analysis including extracting, based on the reflectance of energy from the geographical area of land captured in the image pixel, data representing the plurality of trees; and determining, based on the extracted data, at least a crown dominance value of a tree genus in the image pixel;

generating, based on the performed graphic analysis, a forest inventory for the geographical area of land; and determining a value of or a management plan for the geographical area of land based on the generated forest inventory;

wherein at least one of the receiving, the performing, the generating, and the determining is performed by at least one processor of at least one computing system.

22. The method of claim 21, wherein the generating includes generating said forest inventory based on at least one of the following: an elevation data for the land, a slope data for the land, an aspect data for the land, and any combination thereof.

23. The method of claim 21, wherein the generating includes determining for the image pixel a plurality of nearest neighbor pixels in terms of statistical distance, wherein data regarding the tree genera, number of trees, and tree sizes corresponding to the nearest neighbor pixels is known;

generating, using the nearest neighbor pixels, a probability function for predicting the probability that a tree of a particular genus, when present on the land represented by the image pixel, would have a given size; and predicting, using the probability function, the tree genera for a plurality of trees within the land represented by the image pixel.

24. An apparatus for assessing forest inventory, the apparatus comprising:

at least one memory;

at least one processor operatively coupled to the memory and configured to:

receive data from radar imagery of the land, spectral imagery of the land, and actual tree survey data physically collected using one or more ground-based measures for a geographical area of land, the geographical area of land being represented by an image pixel, the image pixel representing a plurality of trees contained within the geographical area of land, wherein the one or more ground-based measures are positioned relative to a geographical area of land to physically collect an actual tree survey data, collect the actual tree survey data, and configured to transmit the collected to data to the at least one processor communicatively coupled with the one or more ground-based measures, wherein one or more sensors are positioned above the geographical area of land at a predetermined location in space and obtain a reflectance of energy from the geographical area of land;

rasterizing at least one radar image and at least one spectral image to generate the image pixel, the generated image pixel containing data associated with a predetermined size portion of at least one of the following: the at least one radar image and the at least one spectral image;

performing, based on the received data and the rasterizing, a graphic analysis of the image pixel, the graphic analysis including extracting, based on the reflectance of energy from the geographical area of land captured in the image pixel, data representing the plurality of trees; and determining, based on the extracted data, at least a crown dominance value of a tree genus in the image pixel;

generating, based on the performed graphic analysis, a forest inventory for the geographical area of land; and determine a value of or a management plan for the geographical area of land based on the generated forest inventory.

25. The apparatus of claim 24, wherein the at least one processor is configured to generate the forest inventory based on at least one of the following: an elevation data for the land, a slope data for the land, an aspect data for the land, and any combination thereof.

\* \* \* \* \*